(12) United States Patent
Brechelente

(10) Patent No.: US 8,079,279 B2
(45) Date of Patent: Dec. 20, 2011

(54) SUPPORT ASSEMBLY FOR MOVEMENT BY MEANS OF COUPLING BETWEEN THREADED BAR AND NUT WITH THREADED THROUGH HOLE

(75) Inventor: Natale Brechelente, Florence (IT)

(73) Assignee: Bimeccanica S.R.L., Castelfiorentino (IT)

( * ) Notice: Subject to any disclaimer, the term of this patent is extended or adjusted under 35 U.S.C. 154(b) by 975 days.

(21) Appl. No.: 11/916,715

(22) PCT Filed: Jun. 7, 2006

(86) PCT No.: PCT/IT2006/000423
§ 371 (c)(1),
(2), (4) Date: Dec. 6, 2007

(87) PCT Pub. No.: WO2006/131948
PCT Pub. Date: Dec. 14, 2006

(65) Prior Publication Data
US 2008/0202286 A1    Aug. 28, 2008

(30) Foreign Application Priority Data
Jun. 10, 2005 (IT) .................. FI2005A0124
Jun. 10, 2005 (IT) .................. FI2005A0126

(51) Int. Cl.
*F16H 29/20* (2006.01)
(52) U.S. Cl. .................................... 74/89.39
(58) Field of Classification Search .............. 74/89.23, 74/89.32, 89.33, 89.37, 89.39, 89.42, 424.71, 74/424.72, 424.78, 424.94; 248/424, 429; 384/13
See application file for complete search history.

(56) References Cited

U.S. PATENT DOCUMENTS

| | | | | |
|---|---|---|---|---|
| 2,187,390 A | * | 1/1940 | Anderson et al. | 187/268 |
| 2,734,394 A | | 2/1956 | Chauvel | |
| 3,398,598 A | | 8/1968 | Gress, Jr. | |
| 3,533,298 A | | 10/1970 | Gerber | |
| 4,542,661 A | * | 9/1985 | Teramachi | 74/424.75 |
| 4,872,795 A | | 10/1989 | Davis | |
| 5,171,002 A | | 12/1992 | Herke et al. | |
| 5,195,391 A | * | 3/1993 | Barbat et al. | 74/89.22 |
| 5,239,297 A | * | 8/1993 | Kley | 341/13 |
| 5,755,310 A | * | 5/1998 | Wourms | 187/267 |
| 6,634,246 B2 | * | 10/2003 | Ohya et al. | 74/89.44 |
| 6,655,225 B1 | * | 12/2003 | Nagai et al. | 74/89.33 |
| 6,880,676 B2 | * | 4/2005 | Tsukada et al. | 184/5 |
| 7,278,332 B2 | * | 10/2007 | Nakatani et al. | 74/89.44 |
| 2005/0103138 A1 | | 5/2005 | Chen et al. | |

FOREIGN PATENT DOCUMENTS

| | | |
|---|---|---|
| DE | 203 15 835 U1 | 3/2005 |
| EP | 0 435 204 A2 | 7/1991 |
| EP | 0 562 362 A1 | 9/1993 |

* cited by examiner

*Primary Examiner* — Thomas R Hannon
*Assistant Examiner* — Phillip A Johnson
(74) *Attorney, Agent, or Firm* — McGlew and Tuttle, P.C.

(57) ABSTRACT

A modular support (7) with holes (10) for attachment screws is equipped with a through seat (7A) with axial stop (7B) for a nut (9) capable of being received and engaged in said through seat; the modular support (7) can be utilized simply by preparing—on the load bearing structure—the threaded holes for the screws and a trace for a transverse spline, partly received in another trace (16) in the support (7).

14 Claims, 6 Drawing Sheets

SUPPORT ASSEMBLY FOR MOVEMENT BY MEANS OF COUPLING BETWEEN THREADED BAR AND NUT WITH THREADED THROUGH HOLE

The invention relates to the mechanical field where use is made of movement systems involving the use of a threaded bar and of one or more nuts with threaded hole. These two components are generally supplied by specialized manufacturers and the user must provide—in the structure in which said movement system is required—specific supports suitable to receive said components, to the strict orders provided by the supplier. This makes the use of movement components with threaded bar and nut difficult and costly.

The object of the invention is to simplify use of the aforesaid type of movement systems, reducing the preparation operations to be performed by the user. These and other objects and advantages will be apparent from the text hereunder.

In substance, the invention relates to a support assembly for movement by means of coupling between threaded bar and nut with threaded through hole in question, said assembly comprising: a modular support with holes for screws to be attached to a load bearing structure and with through seat equipped with an axial stop; and a nut capable of being received and engaged in said through seat. Therefore, the user is only required to perform the operations to prepare for said fastening screws. A transverse tongue can be engaged partly in the structure and partly in the modular support.

The through seat can have an axial stop. Alternatively or additionally, the nut can have flanging by means of special screws.

Wear pads with manifolds, to protect the through seat, can also be provided.

The support assembly in question can also comprise a further modular support which is movable and which can comprise both sliding guides for fixing clamps equipped with holes for screws for attaching to the load bearing structure, and a through seat for a supplementary nut receiving the threaded bar; in this way, said further movable modular support can be locked in an adjustable way to the load bearing structure, by means of said clamps, in order to adjust the axial clearance between the two nuts. A dust seal can be provided between the two supports. Alternatively, said further movable support can be attached to the load bearing structure with locking screws, which pass through elongated and slotted holes to allow said adjustment.

A longitudinal tongue can be provided to guide said further support.

In any case, the two nuts of the two supports are cooperating oppositely with respective axial stops, so that said further movable support is locked in a variable way with respect to the modular support in order to obtain adjustment of the axial clearance between the two nuts.

The invention will be better understood by following the description and accompanying drawing, which shows a practical non-limiting exemplary embodiment of said invention. In the drawing.

According to the illustrations in FIGS. 1 to 4, the numeral 1 very summarily indicates a load bearing structure, to which a support assembly, indicated generically with 3, must be attached; said assembly 3 must cooperate with a threaded bar 5, rotation of which obliges axial movement of the assembly 3 and therefore of the structure 1 attached thereto. The assembly 3 comprises a modular support 7, which forms a through seat 7A to house a movement nut 9; the nut rests against a stop 7B formed in the seat 7A, and is locked against rotation with respect to the support 7. The modular support 7 has through holes 10—in this case four in number—to receive screws 12 for attaching the modular support 7 to the load bearing structure 1. It is clear from the above that the assembly of the support 7 and of the nut 9 can be attached to the load bearing structure 1 simply by providing on said load bearing structure holes 14 positioned corresponding to the position of the holes 10 produced in the block of the modular support 7. The modular support 7 inferiorly (looking at the drawing) has a transverse housing 16, partially received in which is a tongue 17, projecting partially under the modular support 7. Besides the holes 14, a transverse seat 18 with respect to the axis of the seat 7A, suitable to receive the projecting portion of the tongue 17, must be produced in the structure 1. The tongue 17 can also be dimensioned to interfere with the nut 9, to thus also perform the function of blocking the nut 9 against axial and angular movements. The tongue can be fixed to the support 7 with screws 19.

With the system described above, the user of the assembly 3, 7, 9 only requires to prepare on the load bearing structure 1 the threaded holes 14 to engage the screws 12 and the transverse seat 18, without any other need for specific measures, which are instead required when the user must prepare the structure 1 specifically in order to attach components received from the supplier of the assembly of a nut and of a support for said nut. The tongue 17 ensures exact positioning of the assembly 3, which is locked with the screws 12.

Figure 1:
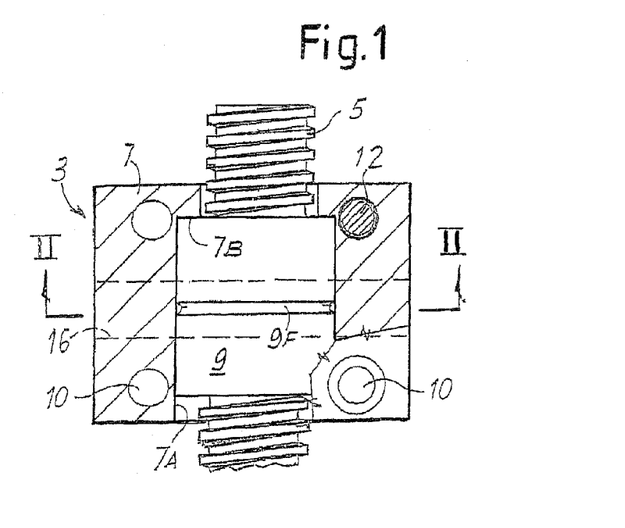
FIGS. 1 to 4 show a first embodiment for horizontal movements, in a partial section without accessories, in the sections along line II-II in FIG. 1 and III-III in FIG. 2, and in an exploded perspective view equipped with accessories.
Figure 2:
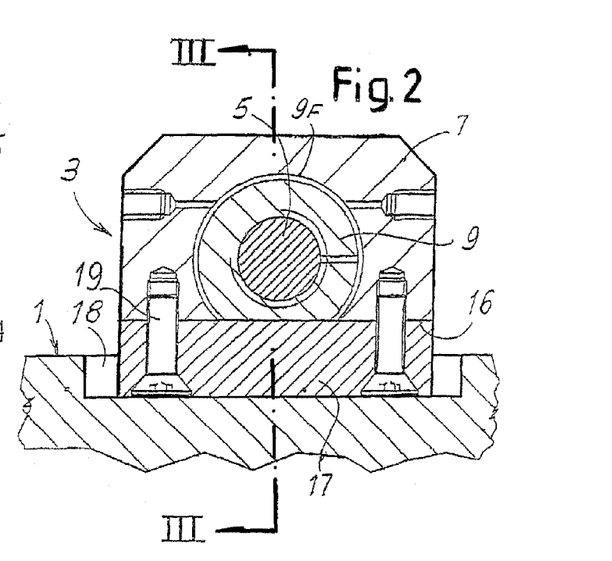
Figure 3:
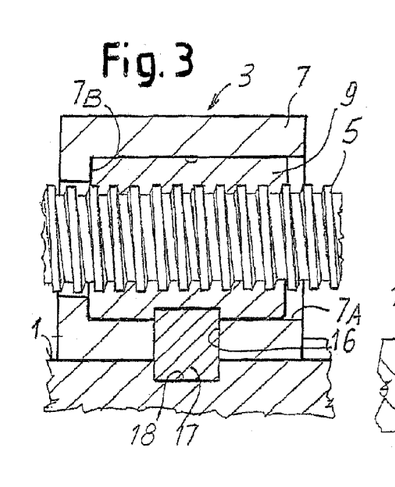
Figure 4:
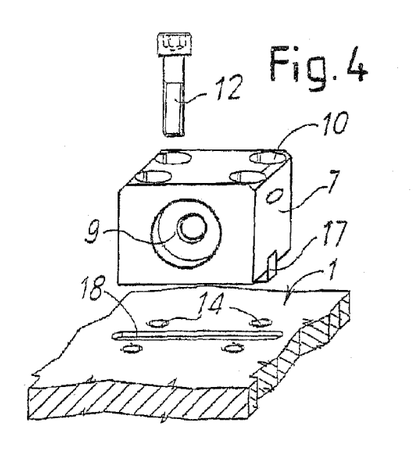
Figures 5, 6, 7:
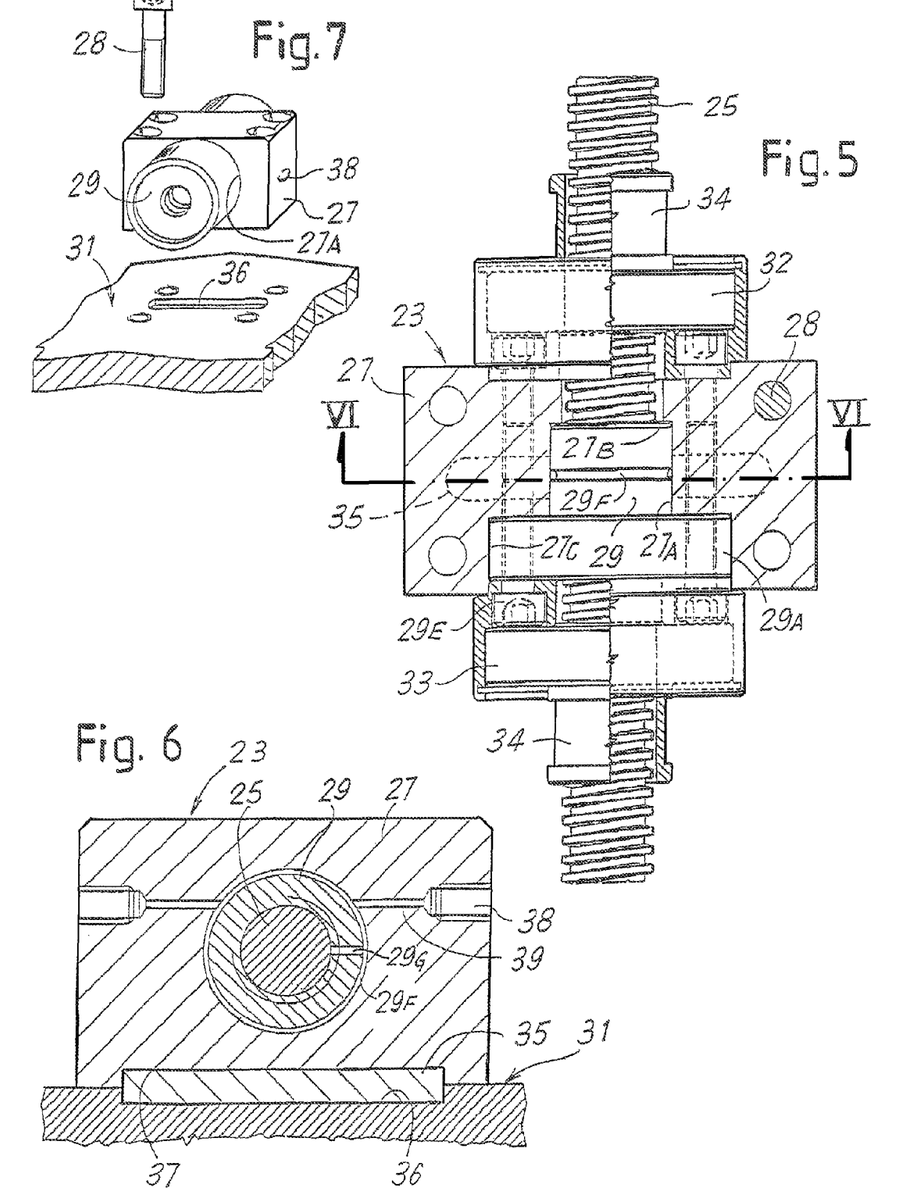
FIGS. 5 to 7 show, similarly to FIGS. 1 to 4, a second embodiment in the axial view and partial section, in the section according to VI-VI in FIG. 5, and in an exploded perspective view.
Figures 8, 10:
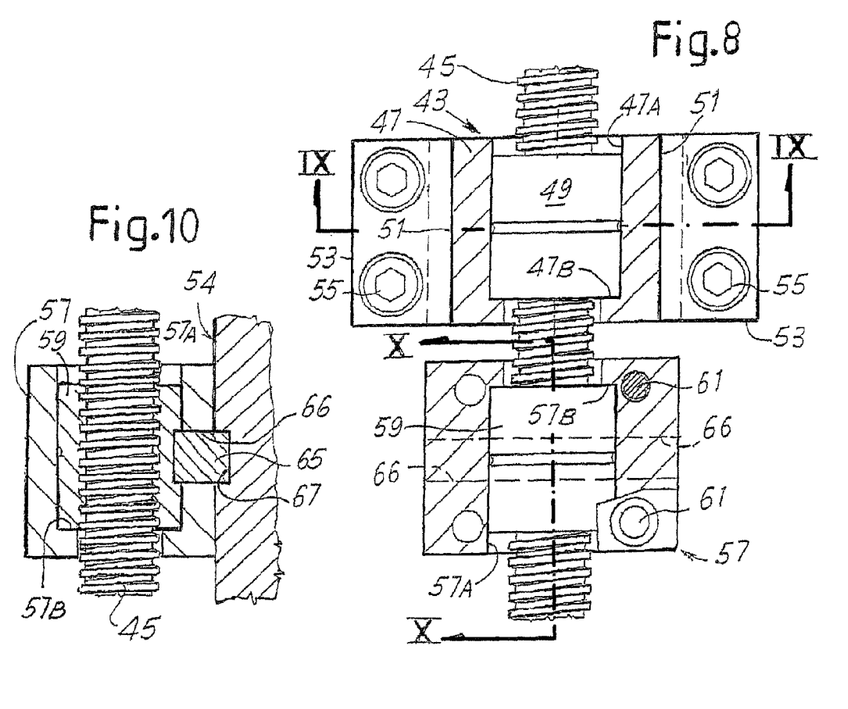
FIGS. 8 to 11 show an embodiment equipped with an arrangement for horizontal movement, suitable to reduce or control the clearance between two nuts, in a longitudinal view and partial section approximately according to VIII-VIII in FIG. 9, in a section according to IX-IX in FIG. 8, in a section according to X-X in FIG. 8 and in an exploded perspective view.
Figures 9, 11:
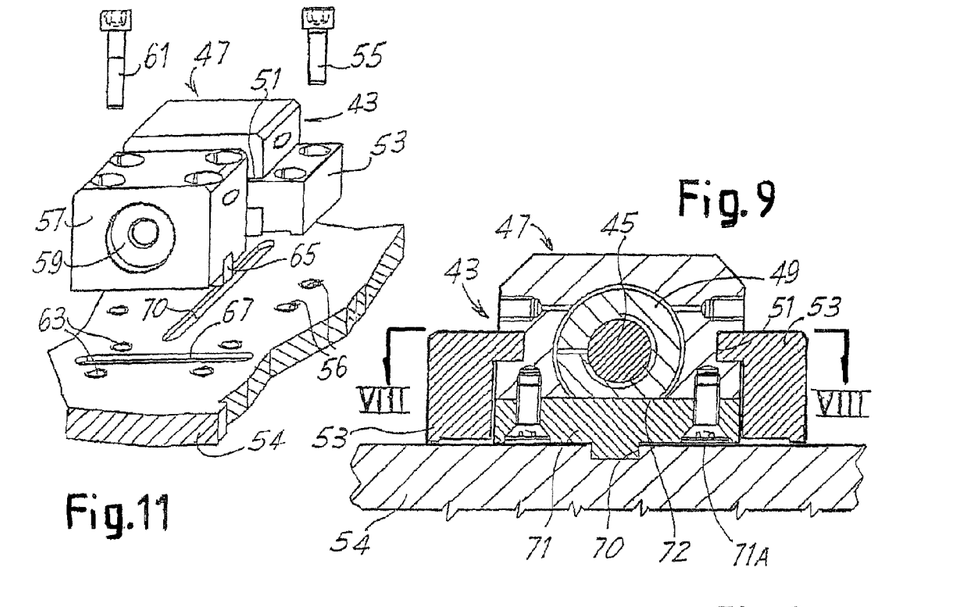
Figures 12, 13, 14, 15:
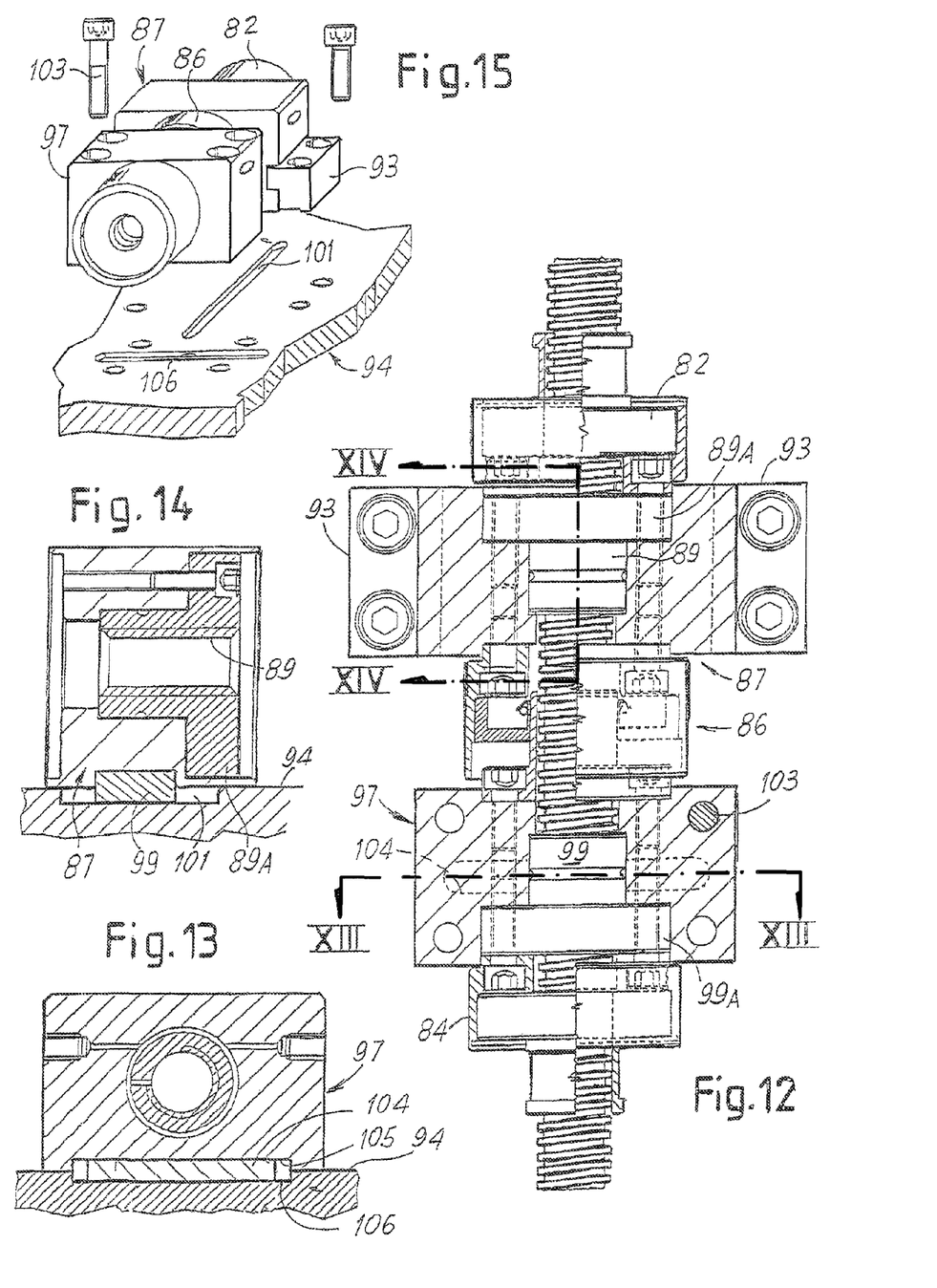
FIGS. 12 to 15 show an embodiment similar to the one in FIGS. 8 to 11, but equipped with further accessories, in the longitudinal view and partial section, in the sections according to XIII-XIII and XIV-XIV in FIG. 13 and in an exploded perspective view.

FIGS. 5 to 7 show an embodiment equivalent to the one in FIGS. 1 to 4 with an assembly 23 intended to cooperate with a threaded bar 25. The assembly 23 comprises a modular support 27 which forms a through seat 27A with axial stop 27B for a nut 29 similar to the one 9, but differing therefrom due to the presence of a flanging 29A which is received in a housing 27C formed coaxially to the through seat 27A, 27B produced in the support 27. Moreover, optional accessories can be provided, such as felt wear pads 32, 33 and optional manifolds 34 for rubber sleeves combined with the threaded bar 25. The modular support 27 is attached—as in the previous case—using screws 28 similar to those 12 for attaching to the load bearing structure 1, and with the advantages already mentioned. The support 27 is positioned with the aid of a tongue 35 partly received in a transverse seat 36 in the structure 31 (equivalent to the one 1) and partly in a seat 37 (FIG. 6) in the support 27.

The nut 29 is locked rotatingly with respect to the support 27, with screws 29E, which pass through the flange 29A to be screwed into specific threaded holes in the support 27.

The accessories, such as those 32 and 33, are attached suitably, for example with screws, to the support 27.

A lubrication orifice 38 is provided (see FIG. 6) in the support 27 for lubrication, which is supplied for the inside of the nut 29 (and similarly of the nut 9 in FIGS. 1 to 4) through a passage 39, which reaches the annular groove 29F (and 9F respectively) produced in the seat or preferably in the nut; from the annular groove 29F the lubricant can reach—through one or more passages 29G—the inner threaded hole of the respective nut.

FIGS. 8 to 11 show an embodiment providing an arrangement similar to that of the previous embodiments with a threaded bar 45, a support 57 for a movement nut 59 (similar to the one 9 or 29). However, in this embodiment, there is also a supplementary unit 43 with a supplementary support 47 and a supplementary nut 49, to reduce and eliminate any clearance that may occur during progressive wear of the movement system.

This embodiment provides for a modular support 57 with through seat 57A for a nut 59, which rests against a stop 57B. The modular support 57 can be attached by means of screws 61, which pass through said support and are screwed into holes 63 in the structure 54. Between the modular support 57 and the structure 54 a transverse tongue 65 is provided, partly received in a transverse seat 67 of the structure 54, and partly in a trace 66 produced in the support 47; said trace 66 and the tongue 65 can have dimensions which interfere in the seat 57A to lock, also axially and angularly, the movement nut 59; all according to the previous embodiments.

In this embodiment the unit 43 mentioned above is added. The unit 43 comprises the supplementary modular support 47 which has a through seat 47A for the supplementary nut 49, which is received in said through seat 47A and which rests against a stop 47B oriented opposite the axial stop 57B for the nut 59. Produced in the supplementary modular support 47 are longitudinal guides 51—i.e. parallel to the axis of the seat 47A and of the threaded bar 45—with which fixing clamps 53 for attaching to the load bearing structure 54 (corresponding to those 1 and 31 in the previous examples) can cooperate by means of screws 55 that pass through holes of the clamps 53 to reach threaded holes 56 produced in the load-bearing structure 54. Alternatively, said further support 47 can be attached to the load bearing structure with locking screws that pass through the support with slotted holes to allow adjustment.

The supplementary support 47 is equipped with a tongue 70 which extends longitudinally and is formed by a transverse member 71 received and fastened with screws 71A in a transverse trace 72, which interferes with the seat 47A and with the nut 49 to lock it longitudinally and angularly in the support 47.

With this arrangement it is possible to adjust the position and in particular the distance of the supplementary unit 43 with respect to the fixed modular support 57, by unloose the fastening screws 55 of the clamps 53 of the support 47, to eliminate the clearance that can occur due to progressive wear of the nut 59; in this way the clearance between the two nuts 49 and 59 can be corrected at any time to reduce and even eliminate the clearance between these nuts and the threaded bar 45.

The embodiment in FIGS. 12 to 15 is similar to the embodiment in FIGS. 8 to 11, but includes accessories such as felt wear pads 82 and 84 for external protection of the nuts 89 and 99 equivalent to those 49 and 59 in the example in FIGS. 8 to 11, but differing with respect thereto due to being equipped with flanges 89A and 99A, and with a dust seal 86, to protect the gap between the modular support 87 (similar to the one 47) and the fixed modular support 97 (similar to the one 57). The support 97 is attached in a fixed manner to the load bearing structure 94 (equivalent to the one 54) while the modular support 87 can be adjusted by providing fixing clamps 93 (similar to those 53). With respect to the structure 94 (similar to the one 54) the support 87 is guided to slide limitedly by means of a tongue 99 partly received in the support 87 and partly and slidingly in a longitudinal seat 101 produced in the structure 94. The modular support 97 is instead constrained to the structure 94, as well as by the screws 103, also by a tongue 104 which is partly received in a transverse seat 105 produced in said support 97, and partly in a transverse seat 106 produced in the structure 94, in which seat the tongue 104 can slide limitedly, all for similar functions to those indicated with reference to FIGS. 8 to 11.

Figure 16:
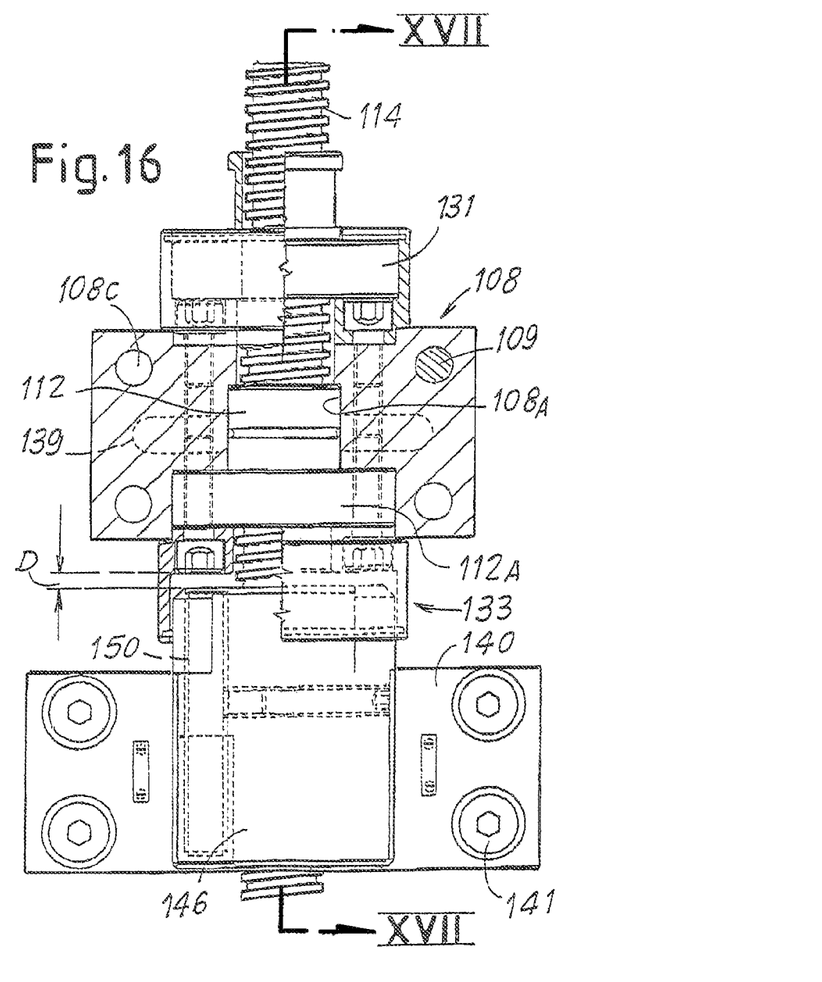
FIGS. 16 to 18 again show another embodiment for application in the case of vertical or oblique movements, in a longitudinal view and partial section, in a section according to XVII-XVII in FIG. 16 and in an exploded perspective view.
Figure 17:
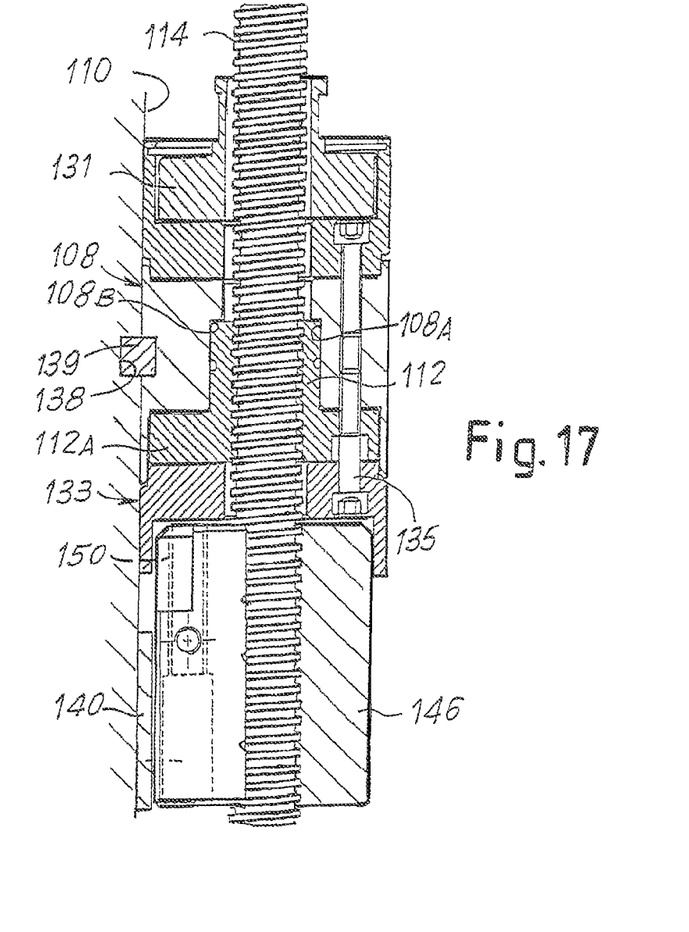
Figure 18:
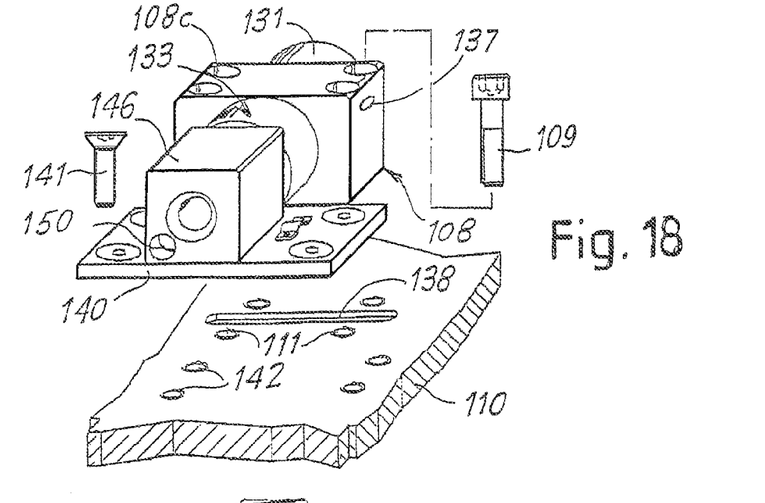

FIGS. 16 to 18 show an embodiment comprising a modular support 108, which can be attached with screws 109 received in through holes 108C to be screwed into threaded holes 111 provided on the load bearing structure 110, to which the assembly is to be attached. Produced in the modular support 108 is a through seat 108A with axial stop 108B for a threaded nut 112 screwed onto the threaded bar 114; the nut 112 is equipped with a flange 112A received and fastened in a specific housing produced coaxially to the through seat 108A of the support 108. Accessories, such as a felt wear pad 131 and an element 133, to protect the coupling between the nut 112 and the threaded bar 114 can be provided, cooperating between said threaded bar 114 and the support 108. Screws 135 lock the nut 112 and the element 133 to the modular support 108. Lubrication can be provided between the threaded bar 114 and the nut 112, starting from a hole 137 in the support 108, originating from which is a lubrication duct leading to the coupling between the through seat 108A and the nut 112 and to the threaded hole of said nut 112. The holes 111 must be positioned to correspond with those 108C; moreover, a transverse seat 138 is provided for a tongue 139, which is also partly received in a seat produced in the support 108. The load on the threaded bar 114 is thus discharged.

The numeral 140 indicates a thickness plate, which can be attached by means of screws 141 in threaded holes 142 produced in the load bearing structure, on which the moving assembly illustrated must be attached for movement by rotation of the threaded bar 114. Cooperating with this plate 140 is a safety nut 146, which is screwed onto the threaded bar 114, and the outside of which is non-circular and preferably has a polygonal section and specifically—as shown in the drawing—a square section with beveled corners. When the safety nut 146 is mounted on the threaded bar 114, one of its side faces grazes the exposed surface of the plate 140, so that the nut 146 is prevented from rotating. In these conditions it is therefore clear that, notwithstanding the movement imparted by the bar 114 on the support structure to which the modular support 108 and the plate 140 are attached, the assembly of the two nuts 112 and 146 remains at the same distance.

In a vertical or oblique installation of the assembly described, wear occurs on the nut 112, which is the flanged lifting nut controlled by rotation of the bar 114; the female thread of this nut 112 becomes worn through time and this therefore causes the nut 112 to be lowered by an amount corresponding to the wear of the thread of said nut, with respect to the nut 146, the thread of which is obviously not subject to wear as no load connected to the load bearing structure rests on it. At the start of operation by the nut 112, between the assembly of said nut 112 and of the modular support 108 thereof on the one side and the nut 146 on the other, there is an initial distance D (FIG. 16) which is gradually reduced as the lifting nut 112, 112A becomes worn; from this it is possible to obtain evaluation of the progressive wear of the female thread of said nut 112, 112A, until reaching a safety limit value, beyond which subsequent or progressive wear of said female thread of the nut 112 can reach values so high that they make it dangerous to continue operating unless the nut is replaced.

This evaluation of the progressive reduction in the distance D from origin to a reduction due to wear of the thread of the lifting nut 112 can be a visual check, although advantageously a sensor is provided to indicate when wear exceeds the limit and the distance D is therefore reduced below a value that would make it dangerous to continue to use the nut 112. This sensor can be composed of an inductive proximity switch, as indicated with 150, incorporated in the safety nut 146, by means of which the distance remaining between the sensor and the metal surface part in front of the upper surface of the safety nut 146 is determined. This can determine a warning signal or even a control to shut down operation of the threaded bar 114 and therefore the absolute necessity to replace the lifting nut 112.

In the case of sufficient dimensioning of the components, the nut 146 can represent a safety device in the event of total failure of the thread of the nut 112, which in this case would rest against the nut 146, onto which the total weight of the mass connected with the assembly 108, 112 is discharged.

The assembly described can be installed on the load bearing structure simply by providing, for attachment, threaded holes in positions easily controllable by means of a template. This allows fast attachment of an assembly provided by the specialized manufacturer of movement systems with threaded bar and cooperating nut.

It is understood that the drawing only shows an example provided by way of a practical arrangement of the invention, which may vary in forms and arrangement without however departing from the scope of the concept on which said invention is based. Any reference numerals in the appended claims are provided to facilitate reading thereof with reference to the description and to the drawing, and do not limit the scope of protection represented by the claims.

The invention claimed is:

1. A support assembly for movement by means of coupling between threaded bar and nut with threaded through hole, the support assembly comprising:
   a modular support with holes for screws for attaching to a load bearing structure and with a through seat, said modular support comprising a first axial stop;
   a first nut capable of being received in said through seat;
   a supplementary nut;
   a further movable modular support comprising a second axial stop and a further through seat for said supplementary nut, said second axial stop being located opposite said first axial stop, said first nut being fixed in an axial direction of the threaded bar via said first axial stop, supplementary nut being fixed in said axial direction of the threaded bar via said second axial stop, said further movable support being lockable to the loading bearing structure in a variable manner with respect to said first nut in said modular support for adjustment of an axial clearance between said first nut and said supplementary nut such that the axial clearance between said first nut and said second nut and the threaded bar is reduced.

2. Support assembly as claimed in claim 1, wherein said first axial stop is formed in said through seat.

3. Support assembly as claimed in claim 1, wherein said first nut comprises a flanging and wherein a housing with holes for said flanging is formed in said modular support.

4. Support assembly as claimed in claim 1, further comprising at least one tongue received in seats in the load bearing structure and in the modular support.

5. Support assembly as claimed in claim 1, further comprising wear pads, which can be provided to protect the through seat and said further through seat.

6. Support assembly as claimed in claim 1, wherein the modular support and movable modular support comprise opposite flanged nuts.

7. A support assembly, comprising:
   a threaded bar;
   a load bearing structure;
   a connection element;
   a fixed modular support comprising a first axial stop, at least one hole and a fixed modular support through seat, said at least one hole receiving at least a portion of said connection element, wherein said fixed modular support is fixed to said loading bearing structure via said connection element;
   a first nut arranged in said fixed modular support through seat, said first nut comprising a first nut threaded through hole;
   a second nut comprising a second nut threaded through hole, said threaded bar extending through said first nut threaded through hole and said second nut threaded through hole;
   a movable modular support comprising a second axial stop and a movable modular support through seat, said second nut being arranged in said movable modular support through seat, said second axial stop being opposite said first axial stop, said first nut being fixed in an axial direction of the threaded bar via said first axial stop, said second nut being fixed in said axial direction of the threaded bar via said second axial stop, said movable modular support being movable in a direction of said fixed modular support, wherein said movable modular support is fixable in a plurality of positions on said loading bearing structure, each of said positions being located at a spaced location from said fixed modular support, wherein movement of said movable modular support in a direction of said fixed modular support reduces an axial clearance between said first nut and said second nut and the threaded bar.

8. A support assembly in accordance with claim 7, wherein said load bearing structure comprises a first slot, a second slot and a first load bearing structure hole, said first load bearing structure hole receiving at least a portion of said connection element, said first slot extending in a direction essentially perpendicular to said axial direction of said threaded bar, said second slot extending in a direction parallel to said axial direction of said threaded bar, said fixed modular support comprising a first tongue portion, said movable modular support comprising a second tongue portion, said first slot receiving said first tongue portion, said second slot receiving said second tongue portion.

9. A support assembly in accordance with claim 8, wherein said movable modular support and said fixed modular support define a first axial space with said movable modular support in one of said positions, said movable modular support and said fixed modular support defining a second axial space with said movable modular support in another one of said positions, said first axial space having a dimension that is greater than a dimension of said second axial space.

10. A support assembly in accordance with claim 9, wherein said movable modular support is fixed in a first area of said load bearing structure and said fixed modular support is fixed in a second area of said load bearing structure, said first area being different from said second area, said first nut being non-rotatable with respect to said fixed modular support, said second nut being non-rotatable with respect to said movable modular support.

11. A support assembly, comprising:
a threaded bar;
a load bearing structure;
a plurality of screws;
a modular support comprising a plurality of holes, a modular support axial stop and a modular support through hole, each screw extending through one of said holes to fix said modular support to said load bearing structure for screws;
a first nut, said modular support through hole receiving said first nut;
a supplementary nut;
a movable modular support comprising a movable modular support axial stop and a movable modular support through seat, said movable modular support through seat receiving said supplementary nut, said movable modular support axial stop being located opposite said modular support axial stop, said first nut being fixed in an axial direction of the threaded bar via said modular support axial stop, said supplementary nut being fixed in said axial direction of the threaded bar via said movable modular support axial stop, said movable support being movable with respect to said modular support, wherein a first axial clearance is provided between said movable support and said modular support and said threaded bar with said movable modular support in a first position on said load bearing structure and a second axial clearance is provided between said movable modular support and said modular support and said threaded bar with said movable modular support in a second position on said load bearing structure, said second axial clearance having a dimension that is less than a dimension of said first axial clearance.

12. A support assembly in accordance with claim 11, wherein said load bearing structure comprises a first slot, a second slot and a first load bearing structure hole, said first load bearing structure hole receiving at least a portion of one of said screws, said first slot extending in a direction essentially perpendicular to said axial direction of said threaded bar, said second slot extending in a direction parallel to said axial direction of said threaded bar, said modular support comprising a first tongue portion, said movable modular support comprising a second tongue portion, said first slot receiving said first tongue portion, said second slot receiving said second tongue portion.

13. A support assembly in accordance with claim 12, wherein said movable modular support and said modular support define a first axial space with said movable modular support in one of said positions, said movable modular support and said modular support defining a second axial space with said movable modular support in another one of said positions, said first axial space being greater than said second axial space.

14. A support assembly in accordance with claim 13, wherein said movable modular support is fixed in a first area of said load bearing structure and said modular support is fixed in a second area of said load bearing structure, said first area being different from said second area, said first nut being non-rotatable with respect to said modular support, said supplementary nut being non-rotatable with respect to said movable modular support.

* * * * *

UNITED STATES PATENT AND TRADEMARK OFFICE
CERTIFICATE OF CORRECTION

PATENT NO. : 8,079,279 B2  
APPLICATION NO. : 11/916715  
DATED : December 20, 2011  
INVENTOR(S) : Brachelente Page 1 of 1

It is certified that error appears in the above-identified patent and that said Letters Patent is hereby corrected as shown below:

Cover Page: Item 30 should read

Correct:
Foreign Application Priority Data - FI2005A000124 and Foreign Application Priority Data - FI2005A000126

Incorrect:
Foreign Application Priority Data - FI2005A0124 and Foreign Application Priority Data - FI2005A0126

Signed and Sealed this
Twenty-first Day of February, 2012

David J. Kappos
*Director of the United States Patent and Trademark Office*